Patented Nov. 27, 1928.

1,692,811

UNITED STATES PATENT OFFICE.

FRANK C. BLAKE, DECEASED, LATE OF WILMINGTON, DELAWARE, BY ROBERTA L. BLAKE, ADMINISTRATRIX, OF WILMINGTON, DELAWARE, ASSIGNOR TO LAZOTE INC., OF WILMINGTON, DELAWARE, A CORPORATION OF DELAWARE.

MANUFACTURE OF HYDROGEN.

No Drawing. Application filed July 20, 1927. Serial No. 207,319.

This invention relates to the production of hydrogen by the catalytic reaction of steam and carbon monoxide.

It is known that hydrogen may be prepared by the catalytic reaction of steam with gaseous mixtures containing carbon monoxide, the chemical reaction involved being as follows:

$$CO + H_2O = H_2 + CO_2.$$

This process has found considerable commercial application in the manufacture of hydrogen from gaseous fuels such as water-gas, coal gas, coke oven gas, etc. It has been observed, however, that under some conditions of operation considerable difficulty is occasioned by the decomposition of carbon monoxide in the reaction apparatus in accordance with the following equation:

$$2CO = CO_2 + C.$$

The resultant deposition of carbon is most objectionable, for it may in a relatively short time produce a marked increase in the pressure drop thru the reaction apparatus and/or greatly retard or even completely inhibit the activity of the catalyst. It was found that this phenomenon occurs to an especially marked degree whenever the steam conversion is carried out under such conditions that the gases in the reaction apparatus contain high concentrations of carbon monoxide, for instance about 20% or more.

It is the object of the present invention to provide a method for the practical elimination of carbon deposition in the manufacture of hydrogen by the catalytic reaction of steam and carbon monoxide.

Other objects and advantages of the invention will be apparent as it is better understood by reference to the following specification in which its details and preferred embodiments are described.

The metals of the iron group, that is to say iron, nickel and cobalt, have heretofore been considered as useful as catalysts for the conversion of mixtures of steam and carbon monoxide to hydrogen, they having been recommended and quite generally employed as catalysts per se or as additions to other catalytic materials. It was found, however, that the presence of metals of the iron group during the reaction increases greatly the amount of carbon deposited and the manufacture of hydrogen is, therefore, carried out with catalysts free from these metals.

The need for avoiding the presence of iron group metals is also important with respect to the interior surfaces of the reaction apparatus. Although iron and alloys thereof have heretofore been used for construction of the reaction apparatus, it was found that the amount of carbon deposited is greatly decreased if the interior surfaces of the reaction apparatus with which the hot carbon monoxide contacts are constructed of non-ferrous materials. Furthermore, the use of iron is objectionable for with continued use the iron surface becomes activated, apparently thru oxidation and reduction, so that the carbon monoxide is catalyzed to some extent by the interior surfaces of the apparatus. The occurrence of this phenomenon is objectionable since, being practically impossible of regulation, it makes the necessary control of catalyst temperature more difficult. On the other hand, non-ferrous materials do not exhibit this phenomenon of activation in a massive condition, altho some of them when properly prepared are catalysts for the reaction. The term "non-ferrous materials" is used in this connection to indicate materials other than metals of the iron group, the metals nickel and cobalt being considered for the purposes of this specification as the equivalents of iron. Thus, for example, the surfaces may be enamelled or coated with chromium, aluminum or copper, or the apparatus may be constructed of copper, silver, aluminum or suitable non-ferrous alloys.

As regards the composition of the catalyst alone it is to be understood that for practically satisfactory results the absolute exclusion of iron is not essential, providing the proper precautions are taken with respect to the materials of construction of the apparatus. In some cases the improvement in catalytic activity due to the presence of small proportions of an iron group metal may be sufficient to compensate for the increased tendency to cause carbon deposition.

The following example will serve to illustrate one method of putting the invention into practice.

A suitable catalyst may be prepared by adding rapidly to one liter of a 2.6 normal solution of potassium hydroxide an equal volume of a solution containing 250 grams of pure potassium chromium sulphate while stirring the potassium hydroxide solution vigorously. Allow the clear, dark green, colloidal solution obtained to set to a firm jelly; break this up and wash it by decantation. Collect the washed product on a filter and dry at 130° C. The dried material is broken into fragments, screened to 8 to 14 mesh size and placed in the convertor in which the reaction is to be carried out. This convertor consists of a vertically arranged cylindrical vessel constructed of copper or lined therewith. The convertor includes a number of horizontal perforated trays, also of copper, on which the catalyst is disposed; as well as an inlet at the top for the gases and an outlet at the bottom for withdrawal of the gaseous products. A heated mixture of about 3 volumes of steam and 1 volume of carbon monoxide, free from sulfur compounds, is passed into the top of the convertor while the catalyst is gradually raised in temperature to about 500° C., at which temperature the reaction is carried out. Thereafter the temperature of the incoming gases and the rate of flow are adjusted to maintain the desired temperature. The gaseous mixture leaving the apparatus consists of hydrogen and carbon dioxide together with some unconverted steam and carbon monoxide. Pure hydrogen may be obtained therefrom by condensation of the steam and removal of the carbon dioxide and carbon monoxide by known methods.

Other catalysts may be used, such for example as mixtures of copper oxide and manganese oxide; chromium oxide and tungsten oxide; or magnesium oxide and vanadium oxide.

The present invention is of special importance in connection with the manufacture of hydrogen by reaction of mixtures of steam and carbon monoxide containing 20% or more of carbon monoxide, for hitherto, as previously pointed out, the deposition of carbon under these conditions has been a source of great difficulty. By the present process, however, it is possible to carry on the manufacture of hydrogen under the said conditions without substantial formation of free carbon.

The process as described is also of particular advantage where the manufacture of hydrogen is being effected under a pressure higher than atmospheric, for it was found that the tendency to deposit carbon is strongly increased by an elevation of the working pressure.

Various changes may be made in the method hereinbefore described without departing from the invention or sacrificing any of the advantages thereof.

What is claimed is:—

1. The process of manufacturing hydrogen which comprises causing a mixture of steam and carbon monoxide to react in contact with a catalyst and in the absence of metals of the iron group.

2. The process of manufacturing hydrogen which comprises causing a mixture of steam and carbon monoxide containing upwards of about 20% of carbon monoxide to react in contact with a catalyst and in the absence of metals of the iron group.

3. In the manufacture of hydrogen by the reaction of steam and carbon monoxide the method of avoiding deposition of carbon which consists in employing for the reaction a catalytic body free from metals of the iron group.

4. The process of manufacturing hydrogen which comprises subjecting steam together with carbon monoxide to the action of a non-ferrous catalyst in an apparatus the interior surfaces of which are of a non-ferrous material.

5. The process of manufacturing hydrogen which comprises subjecting steam together with carbon monoxide to the action of a catalyst free from metals of the iron group.

In testimony whereof I affix my signature.

ROBERTA L. BLAKE,
*Administratrix of Frank C. Blake, deceased.*